US008976449B2

(12) United States Patent
Ida

(10) Patent No.: US 8,976,449 B2
(45) Date of Patent: *Mar. 10, 2015

(54) IDENTIFICATION MEDIUM AND METHOD FOR IDENTIFICATION THEREOF

(75) Inventor: Tohru Ida, Yokohama (JP)

(73) Assignee: NHK Spring Co., Ltd., Yokohama-shi (JP)

( * ) Notice: Subject to any disclaimer, the term of this patent is extended or adjusted under 35 U.S.C. 154(b) by 47 days.

This patent is subject to a terminal disclaimer.

(21) Appl. No.: 13/518,414

(22) PCT Filed: Nov. 8, 2010

(86) PCT No.: PCT/JP2010/069817
§ 371 (c)(1),
(2), (4) Date: Jun. 22, 2012

(87) PCT Pub. No.: WO2011/092922
PCT Pub. Date: Aug. 4, 2011

(65) Prior Publication Data
US 2012/0262767 A1 Oct. 18, 2012

(30) Foreign Application Priority Data
Jan. 28, 2010 (JP) .................................. 2010-016584

(51) Int. Cl.
*G03H 1/00* (2006.01)
*G02B 5/30* (2006.01)
(Continued)

(52) U.S. Cl.
CPC .......... *G02B 5/3016* (2013.01); *G03H 2250/36* (2013.01); *G03H 2250/14* (2013.01);
(Continued)

(58) Field of Classification Search
CPC .. B42D 15/0013; B42D 15/10; B42D 15/105; B42D 2033/10; B42D 2033/26; B42D 2035/22; G03H 1/0011; G03H 2222/31; G03H 2250/40; G03H 2250/42; G02B 5/3016; G02B 5/3083; G02B 5/32

USPC ................ 359/2, 15, 485.03, 485.01, 485.02, 359/485.04, 485.07, 487.01, 487.02, 359/487.04, 487.05, 491.01, 492.01, 3; 283/86, 90, 94; 356/71
See application file for complete search history.

(56) References Cited

U.S. PATENT DOCUMENTS 5,284,364 A * 2/1994 Jain .................................. 283/87
6,344,887 B1 * 2/2002 Ma et al. ........................... 349/98
(Continued)

FOREIGN PATENT DOCUMENTS

EP      2085799 A1 *   8/2009
JP      A-2008-203801  9/2008
(Continued)

OTHER PUBLICATIONS

Apr. 22, 2014 Notice of Rejection issued in Japanese Application No. 2011-551683 with English-language translation.
(Continued)

*Primary Examiner* — Thomas K Pham
*Assistant Examiner* — Nicholas Pasko
(74) *Attorney, Agent, or Firm* — Oliff PLC

(57) ABSTRACT

An identification medium, in which a pattern is clearly altered in observation through a right-handed circularly polarizing filter and observation through a left-handed circularly polarizing filter, is provided. The identification medium is formed by laminating a cholesteric liquid crystal layer, a λ/4 plate, and a linearly polarizing filter layer, in that order, from an observing side. The cholesteric liquid crystal layer is formed with a hologram and selectively reflects light. In an observation through a circularly polarizing filter that transmits the light reflected at the cholesteric liquid crystal layer, light reflected at a pattern printed layer is not perceived due to the function of a circularly polarizing layer. Images are clearly altered by switching a right-handed and a left-handed circularly polarizing filter.

4 Claims, 5 Drawing Sheets

(51) Int. Cl.
 *G02B 27/28* (2006.01)
 *G06K 9/74* (2006.01)
 *B42D 25/29* (2014.01)
 *G03H 1/02* (2006.01)
 *B42D 25/328* (2014.01)
 *B42D 25/391* (2014.01)

(52) U.S. Cl.
 CPC .......... *B42D2035/24* (2013.01); *G03H 1/0256* (2013.01); *G03H 2250/38* (2013.01); *G03H 1/0244* (2013.01); *B42D 2033/10* (2013.01); *B42D 2033/26* (2013.01); *B42D 25/29* (2014.10); *B42D 25/328* (2014.10); *B42D 25/391* (2014.10)
 USPC .............. 359/485.03; 356/71; 349/96; 359/2; 359/15

(56) References Cited

U.S. PATENT DOCUMENTS

| | | | |
|---|---|---|---|
| 6,496,287 B1 * | 12/2002 | Seiberle et al. | 359/15 |
| 6,628,439 B2 * | 9/2003 | Shiozawa et al. | 359/2 |
| 6,806,930 B2 * | 10/2004 | Moia | 349/117 |
| 7,179,393 B2 * | 2/2007 | Isherwood et al. | 216/23 |
| 7,201,821 B2 * | 4/2007 | Hoshino et al. | 156/277 |
| 7,391,546 B2 * | 6/2008 | Hoshino et al. | 359/2 |
| 7,443,585 B2 * | 10/2008 | Hara et al. | 359/489.15 |
| 7,862,880 B2 * | 1/2011 | Katschorek et al. | 428/172 |
| 7,940,436 B2 * | 5/2011 | Kumasawa | 359/2 |
| 7,943,392 B2 * | 5/2011 | Hoshino et al. | 436/170 |
| 8,493,659 B2 * | 7/2013 | Suzuki et al. | 359/489.01 |
| 8,514,354 B2 * | 8/2013 | Amimori et al. | 349/117 |
| 2006/0232734 A1 * | 10/2006 | Schadt et al. | 349/117 |
| 2007/0081144 A1 * | 4/2007 | Hoshino et al. | 356/71 |
| 2007/0159671 A1 | 7/2007 | Hoshino et al. | |
| 2008/0090029 A1 * | 4/2008 | Hoshino et al. | 428/29 |
| 2009/0310195 A1 * | 12/2009 | Suzuki et al. | 359/2 |
| 2010/0123943 A1 * | 5/2010 | Umemoto et al. | 359/2 |
| 2010/0302486 A1 * | 12/2010 | Hoshino et al. | 349/115 |
| 2012/0236292 A1 * | 9/2012 | Hoshino et al. | 356/71 |
| 2012/0262767 A1 * | 10/2012 | Ida | 359/2 |

FOREIGN PATENT DOCUMENTS

| | | |
|---|---|---|
| JP | A-2009-172798 | 8/2009 |
| JP | A-2011-100098 | 5/2011 |
| WO | WO 2004/102234 A1 | 11/2004 |
| WO | WO 2009093372 A1 * | 7/2009 |

OTHER PUBLICATIONS

International Search Report issued in International Application No. PCT/JP2010/069817 dated Dec. 7, 2010.

\* cited by examiner

IDENTIFICATION MEDIUM AND METHOD FOR IDENTIFICATION THEREOF

TECHNICAL FIELD

The present invention relates to an identification medium, which may be used for, for example, determining authenticity of products, and relates to a method for identifying the identification medium.

BACKGROUND ART

An identification medium that can be used for determining authenticity is disclosed in Japanese Unexamined Patent Application Laid-open No. 2009-172798, for example. In this identification medium, different images are viewed by observation through a right-handed or a left-handed circularly polarizing filter, whereby identification is performed. In this technique, the identification medium has a basic structure in which a light-transmissive layer, a printed layer forming a first pattern, and a cholesteric liquid crystal layer, are laminated in turn. The cholesteric liquid crystal layer is formed with a holographic pattern (second pattern) by embossing.

In the identification medium having the above basic structure, it is assumed that the cholesteric liquid crystal layer has a characteristic of selectively reflecting right-handed circularly polarized light. The identification medium may be observed through a circularly polarizing filter (left-handed circularly polarizing filter). The circularly polarizing filter selectively transmits left-handed circularly polarized light and is arranged apart from the identification medium. In this case, right-handed circularly polarized light is reflected at the cholesteric liquid crystal layer, but is cut off by the left-handed circularly polarizing filter and is thereby not perceived. That is, the second pattern formed on the cholesteric liquid crystal layer cannot be viewed.

On the other hand, light reflected at the printed layer includes random linearly polarized components. Therefore, light reflected at the first pattern passes through the left-handed circularly polarizing filter and is perceived. That is, in this case, only the first pattern of the printed layer is selectively viewed.

In contrast, the identification medium may be observed through a circularly polarizing filter (right-handed circularly polarizing filter) that selectively transmits right-handed circularly polarized light. In this case, right-handed circularly polarized light reflected at the cholesteric liquid crystal layer passes through the right-handed circularly polarizing filter, whereby the second pattern is visible. In addition, the first pattern is faintly visible at the same time.

The first pattern is visible for the following reason. In this case, components other than right-handed circularly polarized light having a predetermined wavelength pass through the cholesteric liquid crystal layer and include linearly polarized components in every direction. The linearly polarized components are reflected at the printed layer and pass through the cholesteric liquid crystal layer, and then enter the right-handed circularly polarizing filter. Since the right-handed circularly polarizing filter transmits some of the linearly polarized components, the printed layer is faintly visible.

Thus, in the above technique, the first pattern is visible in each of the observation using the right-handed circularly polarizing filter and the observation using the left-handed circularly polarizing filter. However, in view of optical identifying function, the patterns are preferably clearly altered by switching the right-handed and the left-handed circularly polarizing filter.

DISCLOSURE OF THE INVENTION

In view of these circumstances, an object of the present invention is to provide an identification medium in which a pattern is clearly altered in observation through a right-handed circularly polarizing filter and observation through a left-handed circularly polarizing filter.

In the invention recited in claim 1, the present invention provides an identification medium including a cholesteric liquid crystal layer and a circularly polarizing layer. The cholesteric liquid crystal layer is formed with a hologram of a first pattern and selectively reflects first circularly polarized light having a first circling direction. The cholesteric liquid crystal layer has a first surface in an observing side and a second surface in a side opposite to the observing side. The circularly polarizing layer is arranged at the side of the second surface of the cholesteric liquid crystal layer. The circularly polarizing layer has a first surface at the side of the second surface of the cholesteric liquid crystal layer and has a second surface opposite to the first surface thereof. The circularly polarizing layer selectively transmits second circularly polarized light to the cholesteric liquid crystal layer when natural light enters from the second surface thereof. The second circularly polarized light has a second circling direction which is opposite to the first circling direction.

The "selective transmission" is an optical filtering characteristic of transmitting objective polarized light of incident light and cutting off (or greatly attenuating) the other polarized light.

In the invention recited in claim 2, according to the invention recited in claim 1, the circularly polarizing layer may be formed by laminating a $\lambda/4$ plate and a linearly polarizing filter, in that order, from the observing side. The linearly polarizing filter selectively transmits linearly polarized light.

According to the invention recited in claims 1 and 2, light entering the cholesteric liquid crystal layer from the side of the second surface (back side) thereof is circularly polarized so as to have a circling direction opposite to the first circling direction. Light may be reflected at a pattern printed layer or at a surface of an article to be identified and may enter the cholesteric liquid crystal layer from the side of the second surface thereof. This light is circularly polarized light having a circling direction, which is not selectively reflected by the cholesteric liquid crystal layer. Since this circularly polarized light can pass through the cholesteric liquid crystal layer, this light passes through the cholesteric liquid crystal layer from the second surface to the first surface (observing side).

The identification medium may be observed through a second circularly polarizing filter that transmits the second circularly polarized light. In this case, light reflected at the cholesteric liquid crystal layer is cut off, whereas light transmitted from the back side passes through the second circularly polarizing filter and reaches an observer. Therefore, the holographic image of the cholesteric liquid crystal layer cannot be viewed, but underlying images such as of the pattern printed layer and the surface of the article are viewed.

On the other hand, the identification medium may be observed through a first circularly polarizing filter that transmits the first circularly polarized light. In this case, the light transmitted from the back side of the cholesteric liquid crystal layer is cut off by the first circularly polarizing filter and does not reach the observer. The light reflected at the cholesteric liquid crystal layer passes through the first circularly polarizing filter and reaches the observer. Therefore, the holographic image is viewed, whereas the underlying images are not viewed.

According to the above function, the underlying images are selectively viewed in observation through the second circularly polarizing filter. On the other hand, the holographic image of the cholesteric liquid crystal layer is selectively viewed in observation through the first circularly polarizing filter. Accordingly, clear altering of the patterns is observed by switching the polarizing filters, whereby a high identifying ability is obtained.

In the invention recited in claim 3, according to the invention recited in claim 1 or 2, a printed layer printed with a second pattern may be arranged at the side of the second surface of the circularly polarizing layer. According to the invention recited in claim 3, an underlying image is formed by the pattern of the printed layer separately from the holographic image of the cholesteric liquid crystal layer.

In the invention recited in claim 4, according to the invention recited in claim 3, the printed layer may be a metal reflective layer.

In the invention recited in claim 5, according to the invention recited in claim 3, the printed layer may be a layer formed on the circularly polarizing layer by printing.

In the invention recited in claim 6, the present invention also provides a method for identifying the identification medium recited in one of claims 1 to 5. The method includes a step of observing the identification medium through a first circularly polarizing filter that selectively transmits the first circularly polarized light. The method also includes a step of observing the identification medium through a second circularly polarizing filter that selectively transmits the second circularly polarized light.

EFFECTS OF THE PRESENT INVENTION

According to the invention recited in claims 1 and 2, an identification medium, in which a pattern is clearly altered in observation through a right-handed circularly polarizing filter and observation through a left-handed circularly polarizing filter, is provided.

According to the invention recited in claim 3, an identification medium including two images is provided. One of the images is selectively viewed in observation through a right-handed circularly polarizing filter, and the other is selectively viewed in observation through a left-handed circularly polarizing filter. According to this identification medium, identification can be performed without using an image of an article to be identified.

According to the invention recited in claim 4, a high identifying ability using light, which is reflected at the metal reflective layer and can be vividly perceived, is obtained.

According to the invention recited in claim 5, an identification medium having a simple structure, by which the effects of the present invention are obtained, is provided.

According to the invention recited in claim 6, a method for observing the identification medium of the present invention is obtained.

BRIEF DESCRIPTION OF THE DRAWINGS

FIG. 4A is a front view, FIG. 4B is a cross section, and FIG. 4C is an exploded cross section.

FIG. 5A is a front view, and FIG. 5B is a side view.

FIG. 6A is a front view, and FIG. 6B is a side view.

REFERENCE NUMERALS

100 denotes an identification medium, 101 denotes a cholesteric liquid crystal layer, 102 denotes a $\lambda/4$ plate, 103 denotes a linearly polarizing filter layer, 104 denotes a circularly polarizing layer, 105 denotes a pattern printed layer, 106 denotes an adhesive layer, 110 denotes a left-handed circularly polarizing filter, 111 denotes a right-handed circularly polarizing filter, 200 denotes an identification medium, 201 denotes an adhesive layer, 700 denotes an identification medium, 701 denotes a separator (peelable paper), 702 denotes a two-dimensional code figure, 703 denotes a holographic figure, 704 denotes other printed figure, 711 denotes an adhesive layer, 712 denotes a base paper, 714 denotes an adhesive layer, 715 denotes a linearly polarizing filter layer, 716 denotes a $\lambda/4$ plate, 717 denotes a circularly polarizing filter, 718 denotes a cholesteric liquid crystal layer, 719 denotes a transparent protective layer, 720 denotes a paper label portion, 721 denotes a roll, 730 denotes a holographic label portion, 731 denotes a separator, 732 denotes a roll, 750 denotes an identification label production device, 751 denotes a guide roll, 752 denotes a guide roll, 753 denotes a printing head, 754 denotes an adhering roller, and 755 denotes a winding roll.

BEST MODE FOR CARRYING OUT THE INVENTION

1. First Embodiment

Structure

In the following description, light that is circularly polarized in a counterclockwise direction is called left-handed circularly polarized light, and light that is circularly polarized in a clockwise direction is called right-handed circularly polarized light. In addition, an optical filter that selectively transmits the left-handed circularly polarized light is called a left-handed circularly polarizing filter. In contrast, an optical filter that selectively transmits the right-handed circularly polarized light is called a right-handed circularly polarizing filter.

Figure 1:
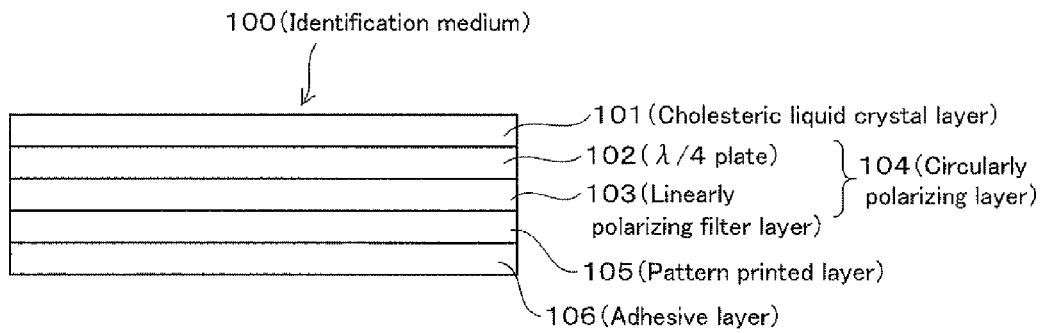
FIG. 1 is a cross section of an embodiment.

FIG. 1 shows an identification medium 100 of an embodiment. The identification medium 100 is formed by laminating a cholesteric liquid crystal layer 101, a $\lambda/4$ plate 102, a linearly polarizing filter layer 103, a pattern printed layer (reflective layer) 105, and an adhesive layer 106, in that order, from an observing side. The cholesteric liquid crystal layer 101 is set so as to selectively reflect right-handed circularly polarized light having a wavelength in green and transmit the other light. The circling direction of the light to be reflected is an example, and it may be a left-handed direction. In addition, the center wavelength of the light to be reflected is not limited to green and may be selected so as to have another color such as red as long as the wavelength can be used for identification.

The cholesteric liquid crystal layer 101 is formed with a hologram, which is not shown in FIG. 1. The hologram is made by embossing a pattern. The hologram forms a holographic image due to interference effects of light reflected at the embossed pattern. The holographic image is viewed by observing light reflected at the cholesteric liquid crystal layer 101.

The λ/4 plate 102 is a layer for adding a phase difference equivalent to λ/4 to transmitted light and is made of a material having refractive anisotropy. The linearly polarizing filter layer 103 is a layer of a linearly polarizing filter that selectively transmits linearly polarized light having a predetermined direction and cuts off other polarized light. In this example, the laminated set of the λ/4 plate 102 and the linearly polarizing filter layer 103 forms a circularly polarizing layer 104.

The cholesteric liquid crystal layer 101 has a first surface to be observed (at upper side in FIG. 1) and a second surface opposite to the first surface (at lower side in FIG. 1). The circularly polarizing layer 104 is arranged at the side of the second surface of the cholesteric liquid crystal layer 101 and is an example of an optical functional layer. The optical functional layer selectively transmits light to the cholesteric liquid crystal layer 101 (to the upper side in FIG. 1) when natural light enters from a surface (at lower side in FIG. 1) opposite to the cholesteric liquid crystal layer 101. This light (in this case, left-handed circularly polarized light) has a second circling direction which is opposite to a first circling direction of light (in this case, right-handed circularly polarized light).

That is, the circularly polarizing layer 104 selectively transmits the left-handed circularly polarized light to the cholesteric liquid crystal layer 101 when natural light enters from the lower side in FIG. 1. In other words, the circularly polarizing layer 104 has the following optical characteristics. When natural light enters from the side of the pattern printed layer 105, left-handed circularly polarized light is preferentially transmitted to the cholesteric liquid crystal layer 101, and the other polarized components are cut off (or greatly attenuated).

Specifically, in the circularly polarizing layer 104, a relationship of directions of optical axes of the λ/4 plate 102 and the linearly polarizing filter layer 103 is set so as to selectively transmit the left-handed circularly polarized light to the cholesteric liquid crystal layer 101 when natural light enters from the side of the pattern printed layer 105. That is, the relationship of the directions of the optical axes of the λ/4 plate 102 and the linearly polarizing filter layer 103 is set so that the circularly polarizing layer 104 functions as a left-handed circularly polarizing filter when viewed toward the cholesteric liquid crystal layer 101.

The pattern printed layer 105 is formed with a predetermined pattern by printing ink on a light transmissive resin film. The pattern printed layer 105 functions as a layer that reflects the pattern to the upper side in FIG. 1. This layer may include a metal reflective layer that is formed at a part of the printing or at the entire surface by evaporation coating or the like, in order to show the pattern more vividly. The adhesive layer 106 is formed by adding black or deep color pigments to an adhesive material. The adhesive layer 106 has a function of affixing the identification medium 100 to an article to be identified and has a function as a light absorbing layer that absorbs incident visible light.

Production Method

First, a cholesteric liquid crystal layer 101 is grown on an oriented base plate, which is not shown in FIG. 1. On the other hand, a laminated set is prepared by laminating a λ/4 plate 102, a linearly polarizing filter layer 103, and a pattern printed layer 105. Then, the cholesteric liquid crystal layer 101 is peeled off from the oriented base plate and is transferred on a light transmissive film (for example, TAC (triacetyl cellulose) film). This film is made of a material that does not affect the polarized condition of light, and this is not shown in FIG. 1. Next, the cholesteric liquid crystal layer 101 is formed with a hologram and is laminated on an exposed surface of the λ/4 plate 102. Each of the layers is fixed with a light transmissive resin adhesive. Lastly, an adhesive layer 106 is formed, whereby an identification medium 100 is obtained.

Although not shown in FIG. 1, a peelable paper is adhered to an exposed surface of the adhesive layer 106. In order to affix the identification medium 100 to an article to be identified, the peelable paper is peeled off, and the adhesive layer 106 is contacted with the article. As a result, the identification medium 100 is affixed to the article.

Function

Figure 2:
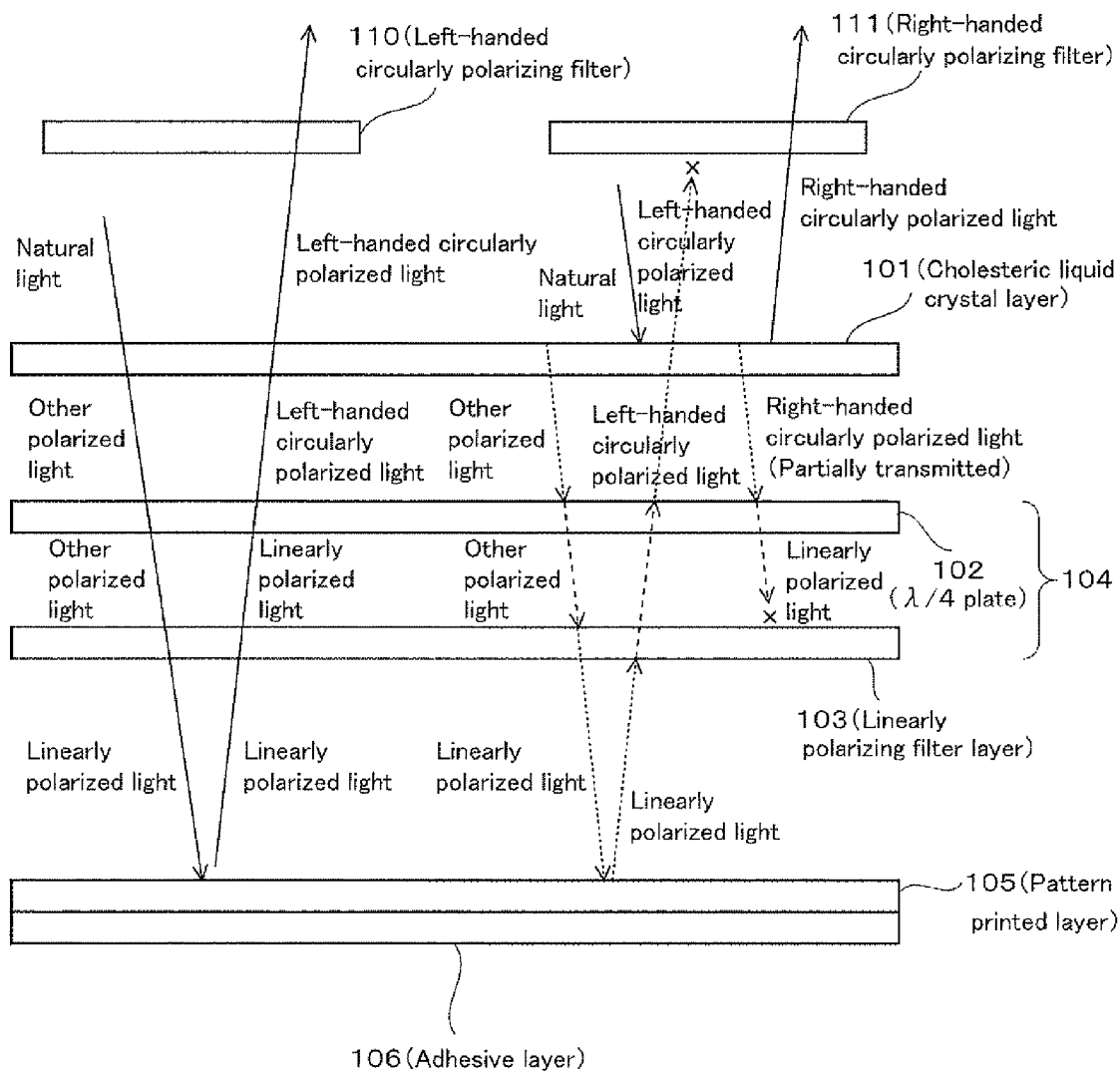
FIG. 2 is a conceptual diagram for showing a structure of an optical function.

FIG. 2 is a conceptual diagram for showing a structure of an optical function of the identification medium 100 in FIG. 1. First, a case of observing the identification medium 100 from the side of the cholesteric liquid crystal layer 101 through a left-handed circularly polarizing filter 110 will be described. The left-handed circularly polarizing filter 110 is arranged apart from the identification medium 100. In this case, natural light enters the cholesteric liquid crystal layer 101. The cholesteric liquid crystal layer 101 is set so as to selectively reflect right-handed circularly polarized light and transmit the other polarized light. Therefore, components other than right-handed circularly polarized light having a predetermined wavelength in the natural light pass through the cholesteric liquid crystal layer 101 and enter the λ/4 plate 102. Then, predetermined linearly polarized components pass through the linearly polarizing filter layer 103 from the λ/4 plate 102 and enter the pattern printed layer 105.

The incident light (linearly polarized light) is reflected at the pattern printed layer 105 without change of the polarized condition and enters the circularly polarizing layer 104 from the lower side in FIG. 2 via a reverse route to the previous route. The circularly polarizing layer 104 is set so as to transmit left-handed circularly polarized light to the upper side in FIG. 2 when light enters from the lower side in FIG. 2. Therefore, the light that entered the circularly polarizing layer 104 is converted into left-handed circularly polarized light by passing therethrough, and thereby passes through the cholesteric liquid crystal layer 101.

In this case, the observation is performed through the left-handed circularly polarizing filter 110. Therefore, the left-handed circularly polarized light that entered the cholesteric liquid crystal layer from the lower side in FIG. 2 passes through the left-handed circularly polarizing filter 110 and is viewable by an observer. Thus, light reflected at the pattern printed layer 105 is perceived. On the other hand, light (right-handed circularly polarized light) reflected at the cholesteric liquid crystal layer 101 is cut off by the left-handed circularly polarizing filter 110. Accordingly, the holographic image of the cholesteric liquid crystal layer 101 cannot be viewed.

Thus, when the identification medium 100 is observed through the left-handed circularly polarizing filter 110, a way of selectively viewing an image is obtained. In this case, the pattern of the pattern printed layer 105 is viewed, whereas the holographic image of the cholesteric liquid crystal layer 101 cannot be viewed.

Next, a case of observing the identification medium 100 from the side of the cholesteric liquid crystal layer 101 through a right-handed circularly polarizing filter 111 will be described. The right-handed circularly polarizing filter 111 is arranged apart from the identification medium 100. In this case, natural light enters the cholesteric liquid crystal layer 101 as in the above case. The cholesteric liquid crystal layer 101 is set so as to selectively reflect right-handed circularly polarized light and transmit the other polarized light. Therefore, right-handed circularly polarized light having a predetermined wavelength in natural light is reflected, and the other components pass through the cholesteric liquid crystal layer 101 and enter the λ/4 plate 102.

The right-handed circularly polarized light from the cholesteric liquid crystal layer 101 passes through the right-handed circularly polarizing filter 111 and is thereby viewable by an observer. On the other hand, the other polarized light (components other than the right-handed circularly polarized light having the predetermined wavelength) that entered the λ/4 plate 102 passes therethrough. Then, predetermined linearly polarized components in the other polarized light pass through the linearly polarizing filter layer 103 to the pattern printed layer 105.

The light (linearly polarized light) incident on the pattern printed layer 105 is reflected thereat without change of the polarized condition and enters the circularly polarizing layer 104 from the lower side in FIG. 2 via a reverse route to the previous route. The circularly polarizing layer 104 is set so as to transmit left-handed circularly polarized light to the upper side in FIG. 2 when light enters from the lower side in FIG. 2. Therefore, the light that entered the circularly polarizing layer 104 is converted into left-handed circularly polarized light by passing therethrough, and thereby passes through the cholesteric liquid crystal layer 101.

In this case, the observation is performed through the right-handed circularly polarizing filter 111. Therefore, the left-handed circularly polarized light that entered and passed through the cholesteric liquid crystal layer from the lower side in FIG. 2 cannot pass through the right-handed circularly polarizing filter 111 and is thereby not viewable by an observer. Thus, only the holographic image formed on the cholesteric liquid crystal layer 101 is selectively viewed.

The selective reflection characteristics of the cholesteric liquid crystal layer 101 are not perfect, and the right-handed circularly polarized light that should be reflected is partially transmitted (light breaks through the cholesteric liquid crystal layer 101). This transmitted component enters the circularly polarizing layer 104. The circularly polarizing layer 104 is set so that left-handed circularly polarized light that entered from the upper side in FIG. 2 is converted into linearly polarized light and is transmitted to the lower side in FIG. 2. Therefore, when the right-handed circularly polarized light enters from the upper side in FIG. 2, this incident light is cut off by the circularly polarizing layer 104. Specifically, when the right-handed circularly polarized light enters from the upper side in FIG. 2 into the circularly polarizing layer 104, the light is converted into linearly polarized light by the λ/4 plate and is cut off by the linearly polarizing filter layer 103. Accordingly, light of the right-handed circularly polarized light component that breaks and passes through the cholesteric liquid crystal layer 101 does not reach the pattern printed layer 105. As a result, the light that broke through the cholesteric liquid crystal layer 101 is not reflected at the pattern printed layer 105.

Thus, when the identification medium 100 is observed through the right-handed circularly polarizing filter 111, a way of selectively viewing an image is obtained. In this case, the pattern of the pattern printed layer 105 is not viewed, and only the holographic image of the cholesteric liquid crystal layer 101 is viewed.

As described above, when the identification medium 100 is observed through the left-handed circularly polarizing filter 110, the pattern formed on the pattern printed layer 105 is selectively viewed. On the other hand, when the identification medium 100 is observed through the right-handed circularly polarizing filter 111, the pattern formed on the cholesteric liquid crystal layer 101 is selectively viewed. That is, by switching the circularly polarizing filters, a condition of viewing only the first image and a condition of viewing only the second image are altered. When the identification medium 100 is observed directly by the eyes without using the circularly polarizing filters, both images (patterns) are simultaneously visible.

Advantages

As described above, when the identification medium 100 is observed by switching the right-handed circularly polarizing filter and the left-handed circularly polarizing filter, the pattern printed layer is viewed in one of the cases. That is, the image of the pattern printed layer 105 or the holographic image of the cholesteric liquid crystal layer 101 is selectively viewed. Therefore, an identification medium, in which clear altering of the patterns is observed, is provided. In addition, when the holographic image of the cholesteric liquid crystal layer 101 is observed, the underlying pattern printed layer 105 is not viewed. Accordingly, the holographic image is clearly viewed without being mixed with the image of the pattern printed layer 105.

First Comparative Example

Optical characteristics in a case of removing the λ/4 plate 102 and the linearly polarizing filter layer 103 of the example in FIG. 2 will be described hereinafter. It is assumed that the identification medium 100 is observed through the right-handed circularly polarizing filter 111. In this case, linearly polarized light having components in random directions enters the pattern printed layer 105. This light is reflected at the pattern printed layer 105 and passes through the cholesteric liquid crystal layer 101 from the lower side to the upper side in FIG. 2. This light passes through the right-handed circularly polarizing filter 111 to the side of an observer while being attenuated, and it is perceived. Therefore, the pattern of the pattern printed layer 105 is simultaneously faintly viewed in addition to the holographic image of the cholesteric liquid crystal layer 101.

Second Comparative Example

Optical characteristics in another case will be described hereinafter. In this case, in the example in FIG. 2, the positions of the λ/4 plate 102 and the linearly polarizing filter layer 103 are interchanged (that is, the surface of the circularly polarizing layer is reversed). It is assumed that the identification medium is observed through the left-handed circularly polarizing filter 110. In this case, the other polarized light that passed through the cholesteric liquid crystal layer 101 enters the laminated structure of the linearly polarizing filter layer 103 and the λ/4 plate 102. This light passes through the laminated structure and is converted into left-handed circularly polarized light. This left-handed circularly polarized light is reflected at the pattern printed layer 105, during which the circling direction thereof is reversed, thereby being converted into right-handed circularly polarized light.

The right-handed circularly polarized light enters the λ/4 plate 102 and then enters the linearly polarizing filter layer 103. As shown in FIG. 2, if right-handed circularly polarized light enters the circularly polarizing layer 104 from the side of the λ/4 plate, the light is cut off by the linearly polarizing filter layer 103, whereby transmitted light is not obtained. Therefore, in this case, the light reflected at the pattern printed layer 105 is not transmitted through the circularly polarizing layer 104 and is not perceived.

In addition, since the identification medium is observed through the left-handed circularly polarizing filter 110, light reflected at the cholesteric liquid crystal layer 101 is also not perceived. Therefore, in the case of using the left-handed circularly polarizing filter 110, both the holographic image of the cholesteric liquid crystal layer 101 and the image of the pattern printed layer 105 are not viewed. Accordingly, the altering of the images of the embodiment of the present invention shown in FIG. 2 cannot be observed. That is, the optical function of the present invention cannot be obtained.

Other Examples

In the structure shown in FIG. 1, the cholesteric liquid crystal layer 101 may have optical characteristics of selectively reflecting left-handed circularly polarized light. In this case, the circularly polarizing layer 104 is set so as to selectively transmit right-handed circularly polarized light when natural light enters from the lower side in FIG. 1.

Instead of providing the pattern printed layer 105, the lower surface of the linearly polarizing filter layer 103 may be printed and be used as a reflective layer that is formed with a pattern. In this case, the structure of the identification medium is simplified, whereby the production cost and the dimensions of the identification medium 100 are reduced.

The method of forming the pattern of the pattern printed layer 105 is not limited to ink printing as long as light reflected thereat is perceived as an image. For example, a layer provided with a metal reflective pattern may be used as the pattern printed layer 105. In this case, an image is formed by light reflected at the metal reflective pattern. Alternatively, the pattern printed layer 105 may be formed of a transparent resin layer and a metal reflective layer that is under the transparent resin layer. The transparent resin layer may be formed with a hologram so that a holographic image is reflected.

Figure 3:
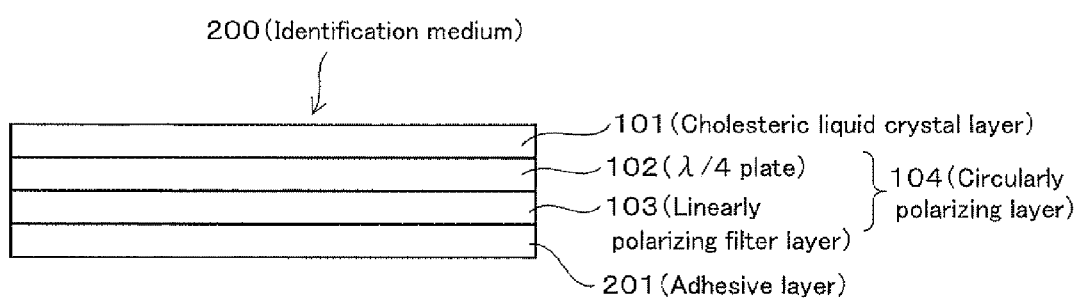
FIG. 3 is a cross section of another embodiment.

FIG. 3 shows an identification medium 200 of another embodiment. The identification medium 200 has a circularly polarizing layer 104 which is provided with an adhesive layer 201 at a lower surface thereof (on the side which is not observed). The adhesive layer 201 is made of transparent resin material. The other components of the identification medium 200 are the same as those of the identification medium 100 in FIG. 1.

The identification medium 200 may be affixed to an article to be identified, by the adhesive force of the adhesive layer 201. In this condition, the identification medium 200 exhibits an identifying function by using a pattern of the surface of the article. That is, in the structure shown in FIG. 3, the pattern (this can be a figure, etc.) on the surface of the article, which is not shown in FIG. 3, is used as a pattern corresponding to the pattern of the pattern printed layer 105 in FIG. 1. This structure does not have a pattern printed layer, thereby being simplified.

On the other hand, in the structure shown in FIG. 1, the adhesive layer 106 may be made so as to be light transmissive. In this case, in addition to the reflected image from the pattern printed layer 105, an image contained in light that is reflected at the surface of an article can be used for identification as an image from a base.

In each of the examples of the present invention described above, the details of the holographic image and the pattern are not limited as long as the identifying ability is thereby obtained. The details may be appropriately selected from the group consisting of diagrams, letters, numeric characters, various designs, figures, etc. In addition, code figures such as bar codes and color codes, or various marks that can be read by enlarging with an optical system, may be used as the holographic image and the pattern.

The article to which the identification medium 100 is affixed is not limited as long as the article needs to be distinguished from counterfeits (i.e., must be determined to be authentic). As for such an article, credit cards, passports, valuable securities, packages of various products, licenses, ID cards, garments, tags to be attached to products, small articles, electronic devices, various parts, industrial products, various consumable supplies, etc. may be used.

In regard to FIG. 2, a case of performing observation for identification is described. In this case, an optical filter (circularly polarizing filter) for observation is arranged apart from the identification medium using the present invention. However, the observation may be performed by contacting the left-handed circularly polarizing filter 110 or the right-handed circularly polarizing filter 111, with the identification medium 100. In this case, although the structure differs, the appearance of the identification medium 100 observed through each of the circularly polarizing filter is the same as in the case described relating to FIG. 2.

2. Second Embodiment

Structure

Figure 4A:
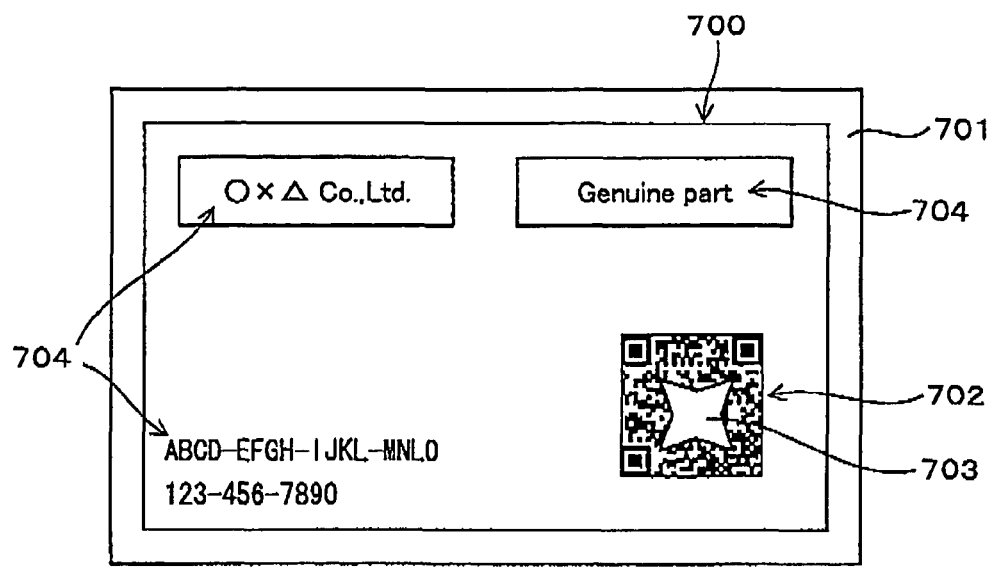
FIGS. 4A to 4C show an identification medium of an embodiment.

FIG. 4A shows a front of an identification medium 700 of an embodiment. The identification medium 700 is attached on a separator (peelable paper) 701. The identification medium 700 is used by being affixed to a mechanical part, an electrical part, or an article of other various products (or a package thereof), etc. The identification medium 700 includes a two-dimensional code FIG. 702 and a holographic FIG. 703 that is laminated on the two-dimensional code FIG. 702. The two-dimensional code FIG. 702 is an example of the second pattern and is, for example, a two-dimensional bar code. The two-dimensional code FIG. 702 includes coded information of, for example, various data relating to an article to which the identification medium is affixed, internet address by which details of the article can be obtained, and the like. The holographic FIG. 703 is an example of the first pattern and provides identifying ability when the two-dimensional code FIG. 702 is read. In addition, the identification medium 700 includes other printed FIG. 704 that are formed by printing, for example, a product name, a name of manufacturer, a lot number, and other details.

Figure 4B:
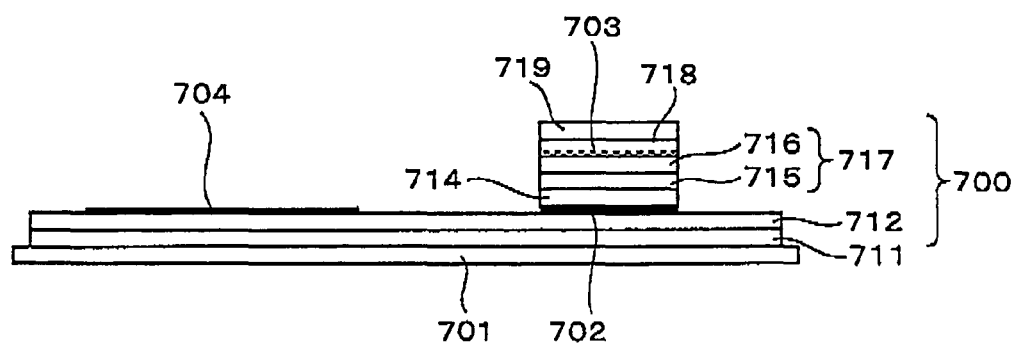

FIG. 4B shows a cross sectional structure of the identification medium 700 that is attached on the separator 701. The cross sectional structure of the identification medium 700 will be described hereinafter. The identification medium 700 has a base paper 712 as a base. The base paper 712 has a lower surface on the lower side in FIG. 4B, which is provided with an adhesive layer 711 made of adhesive material. In order to affix the identification medium 700 to an article, the separator 701 is peeled off from the adhesive layer 711, and the exposed adhesive layer 711 is contacted with the article. As a result, the identification medium 700 is affixed to the article.

The base paper 712 has an upper surface (on the upper side in FIG. 4B) opposite to the side provided with the adhesive layer 711. This upper surface is provided with ink layers of the two-dimensional code FIG. 702 and the other printed FIG. 704 by printing. An optically transparent adhesive layer 714 is provided on the two-dimensional code FIG. 702, and a circularly polarizing filter layer 717 is arranged thereon. The circularly polarizing filter layer 717 is formed by laminating a linearly polarizing filter layer 715 and a λ/4 plate 716.

A cholesteric liquid crystal layer 718 is provided on the circularly polarizing filter layer 717. The cholesteric liquid crystal layer 718 is embossed for exhibiting the holographic FIG. 703. The cholesteric liquid crystal layer 718 is set so as to selectively reflect circularly polarized light in a first circling direction. The circularly polarizing filter layer 717 is set so as to transmit circularly polarized light from the lower side to the upper side in FIG. 4B. This transmitted circularly polarized light has a second circling direction that is reverse to the first circling direction. The holographic FIG. 703 is overlapped on the two-dimensional code FIG. 702. Moreover, a transparent protective layer 719 made of TAC film or the like is provided on the cholesteric liquid crystal layer 718.

Optical Function

In the following descriptions, it is assumed that the cholesteric liquid crystal layer 718 selectively reflects right-handed circularly polarized light. In addition, it is assumed that left-handed circularly polarized light is selectively transmitted through the circularly polarizing filter layer 717 from the lower side to the upper side in FIG. 4B. In this case, the identification medium 700 is observed from the upper side in FIG. 4B. When the identification medium 700 is directly viewed, the two-dimensional code FIG. 702, the holographic FIG. 703, and the other printed FIG. 704, are viewed. The code of the two-dimensional code FIG. 702 cannot be read due to interference of the holographic FIG. 703. For example, when the two-dimensional code FIG. 702 is a two-dimensional bar code, the code cannot be read by a camera of a mobile phone or by a bar code reader.

When the identification medium 700 is observed through a left-handed circularly polarizing filter, right-handed circularly polarized light reflected at the cholesteric liquid crystal layer 718 is cut off by the left-handed circularly polarizing filter and is not perceived. On the other hand, light reflected at the two-dimensional code FIG. 702 passes through the circularly polarizing filter layer 717 from the lower side to the upper side in FIG. 4B and is converted into left-handed circularly polarized light. Then, the transmitted left-handed circularly polarized light passes through the cholesteric liquid crystal layer 718 and the left-handed circularly polarizing filter of a viewer. Accordingly, in the observation through the left-handed circularly polarizing filter, the two-dimensional code figure is selectively clearly viewed. Naturally, in this condition, the two-dimensional code FIG. 702 is optically readable by using a reading device.

When the identification medium 700 is observed through a right-handed circularly polarizing filter, right-handed circularly polarized light selectively reflected at the cholesteric liquid crystal layer 718 passes through the right-handed circularly polarizing filter and is thereby perceived. On the other hand, light reflected at the two-dimensional code FIG. 702 enters the right-handed circularly polarizing filter as left-handed circularly polarized light. Therefore, this light is cut off and is not perceived. That is, when the identification medium 700 is observed through the right-handed circularly polarizing filter, the holographic FIG. 703 is selectively viewed. Moreover, in this condition, by tilting the identification medium 700 and changing the viewing angle, color shift of the cholesteric liquid crystal layer 718 is observed, and identifying function is obtained by the color change.

Production Method

Figure 4C:
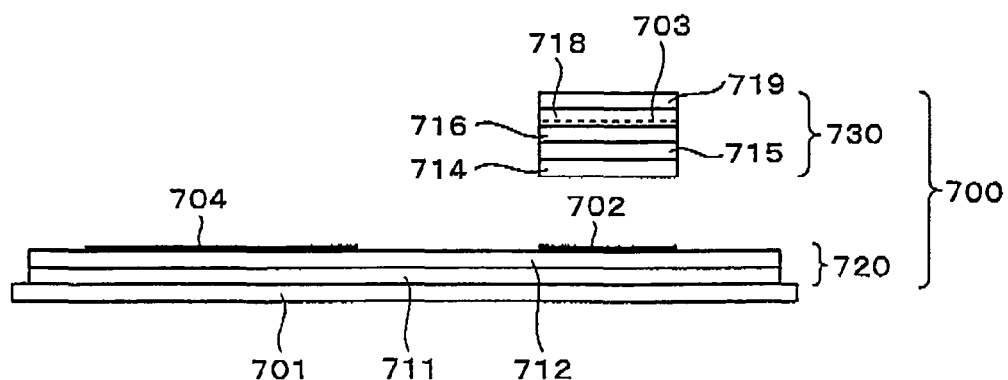

As shown in FIG. 4C, the identification medium 700 attached on the separator 701 is formed of a paper label portion 720 and a holographic label portion 730. In this structure, the paper label portion 720 and the holographic label portion 730 are formed separately and then combined by the adhesive function of the adhesive layer 714, whereby the identification medium 700 is obtained.

Figure 5A:
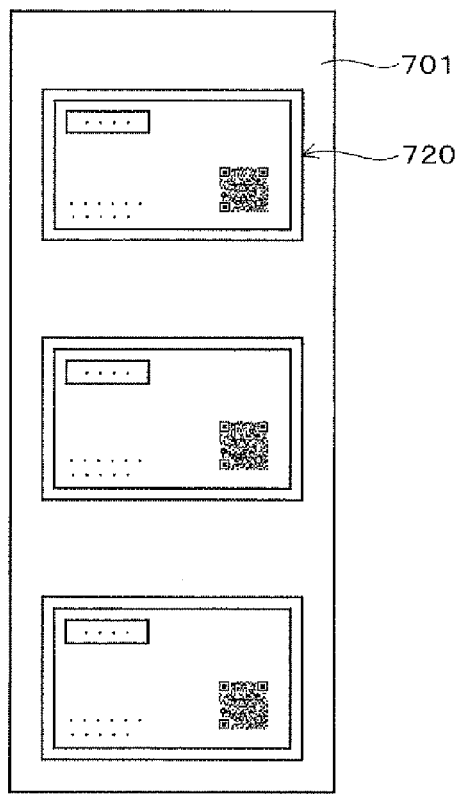
FIGS. 5A and 5B show plural paper label portions of identification mediums of an embodiment, which are attached to a separator.
Figure 5B:
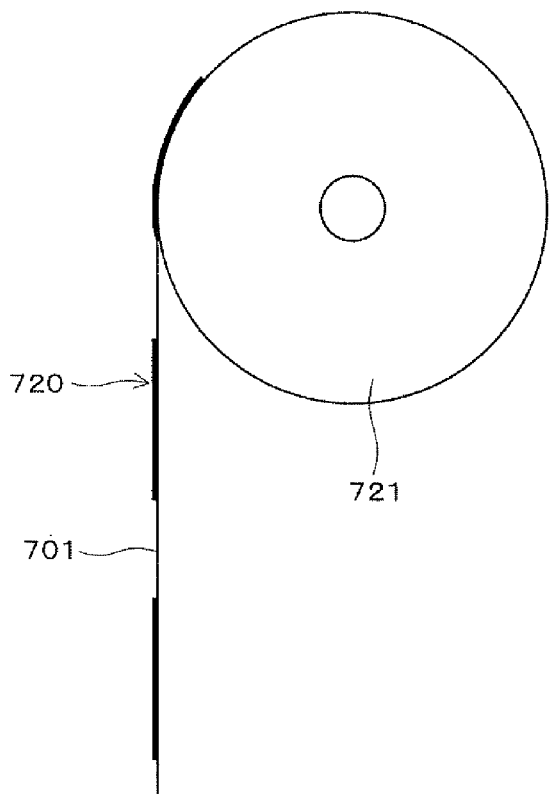
Figure 6A:
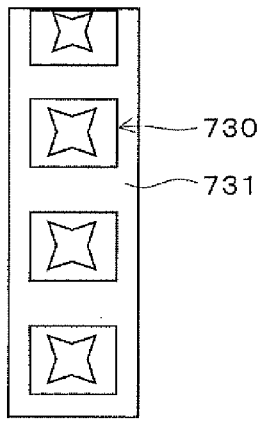
FIGS. 6A and 6B show plural holographic label portions of identification mediums of an embodiment, which are attached to a separator.
Figure 6B:
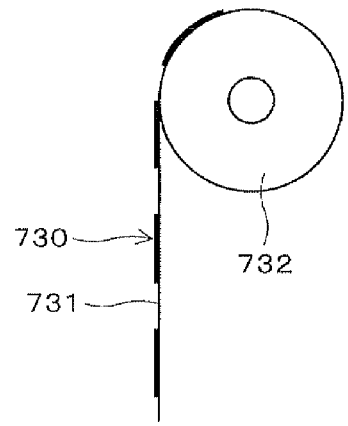

FIGS. 5A and 5B show a plurality of the paper label portions 720 that are attached on a ribbon separator 701 and are thereby formed into a tape shape. FIG. 5A shows a front of the paper label portions 720, and FIG. 5B is a side view of the paper label portions 720 that are rolled by a roll 721. FIGS. 6A and 6B show a plurality of the holographic label portions 730 that are attached on a ribbon separator 731 and are thereby formed into a tape shape. FIG. 6A shows a front of the holographic label portions 730, and FIG. 6B is a side view of the holographic label portions 730 that are rolled by a roll 732.

For example, the holographic label portion 730 is peeled off from the separator 731 and is adhered on the two-dimensional code FIG. 702 (see FIG. 4C) of the paper label portion 720. Thus, the identification medium 700 attached on the separator 701 as shown in FIG. 4A is obtained.

Production Device

Figure 7:
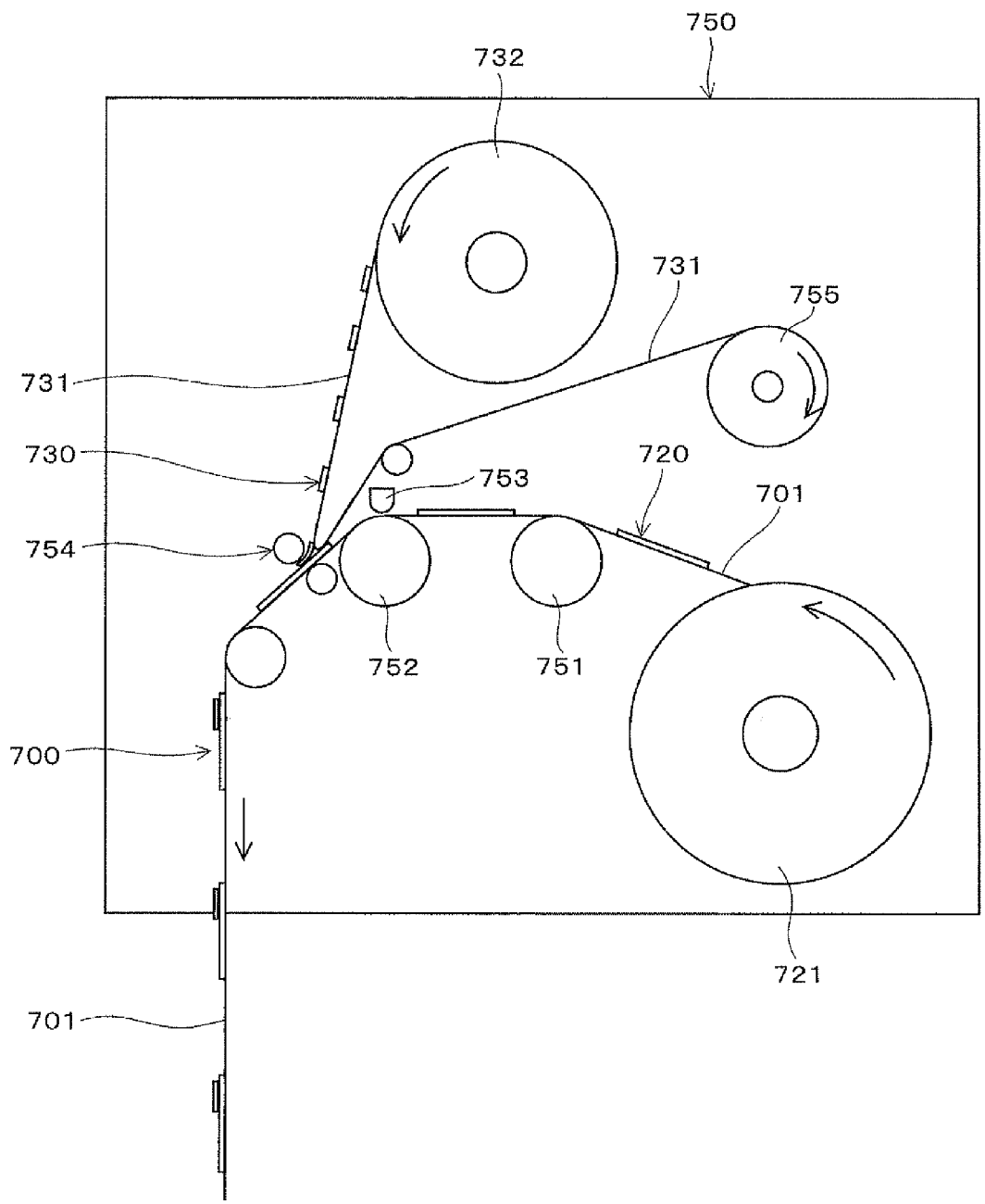
FIG. 7 is a conceptual diagram of an identification label production device of an embodiment.

FIG. 7 shows an example of an identification label production device for producing identification labels in which the identification medium 700 is attached on the separator 701 as shown in FIG. 4A. FIG. 7 shows an identification label production device 750 that is mounted with the roll 721 in FIG. 5B. The roll 721 rolls up the separator 701 on which the paper label portions 720 (see FIG. 4C) are attached. The separator 701 is provided with perforation and can be easily torn off later. The separator 701 on which the paper label portions 720 are attached is unrolled from the roll 721 and is sent to a guide roll 752 via a guide roll 751. A printing head 753 of a printing means is arranged so as to face the guide roll 752, whereby the paper label portions 720 can be printed. The printing head 753 can print a part or the entirety of the two-dimensional code FIG. 702 and the other printed FIG. 704 shown in FIG. 4A. As the printing head 753, an ink-jet type may be used.

Moreover, the identification label production device 750 is mounted with the roll 732 in FIG. 6B. The roll 732 rolls up the ribbon separator 731 on which the holographic label portions 730 (see FIG. 4C) are attached by the adhesive force of the adhesive layer 714. While the separator 701 is unrolled from the roll 721, the separator 731 is synchronously unrolled from the roll 732.

After the separator 731 having the holographic label portions 730 is unrolled from the roll 732, the separator 731 is fed to an adhering roller 754, and the holographic label portions 730 are peeled off from the separator 731 and are separated. The adhering roller 754 is formed of a pair of rolls that face each other. The adhesive layer 714 of the holographic label portion 730 that is separated from the separator 731 is contacted with a surface of the paper label portion 720, which is printed with the two-dimensional code FIG. 702 and the other printed FIG. 704. In this case, as shown in FIG. 4C, the adhesive layer 714 of the holographic label portion 730 contacts the portion of the two-dimensional code FIG. 702 of the paper label portion 720. In this condition, according to the pressure applied by the adhering roller 754, the holographic label portion 730 is adhered to the paper label portion 720. The separator 731 in FIG. 7 is not shown in FIG. 4C. This adhering is performed by the adhesive function of the adhesive layer 714. In this case, the adhesive layer 714 may be irradiated with heat or ultraviolet light according to the material thereof so as to facilitate adhering. After the holographic label portion 730 is adhered to the paper label portion 720, the separator 731 is rolled up by the winding roll 755.

Thus, by the adhering roller 754, the plurality of the identification mediums 700 shown in FIG. 4A are affixed to the separator 701 and are output to the outside of the identification label production device 750. The separator 701 is perforated so as to cut off each identification medium 700 with the separator 701. Therefore, an identification medium 700 in a label shape, which is adhered to the separator 701, is obtained by easy steps.

In the identification medium 700 shown in FIG. 7, while the paper label portion 720 is real-time printed by the printing head 753, the holographic label portion 730, which provides identifying ability when the printed figure is read, may be formed. This process may be performed in a producing scene or a distributing scene (for example, scene of packaging for shipping), of products to be identified. For example, in a facility for shipping products, information corresponding to each of various products that are customized with respect to customers may be printed as the two-dimensional code FIG. 702 by the printing head 753. Then, the holographic FIG. 703 for providing identifying ability may be formed thereon.

INDUSTRIAL APPLICABILITY

The present invention can be used for techniques for determining authenticity.

The invention claimed is:

1. An identification medium, which reflects circularly polarized light having a first circling direction and circularly polarized light having a second circling direction that is opposite to the first circling direction, the medium comprising:
   a cholesteric liquid crystal layer that is formed with a hologram of a first pattern and selectively reflects first circularly polarized light having a first circling direction, the cholesteric liquid crystal layer having a first surface in an observing side and a second surface in a side opposite to the observing side; and
   a circularly polarizing layer arranged at the side of the second surface of the cholesteric liquid crystal layer, the circularly polarizing layer having a first surface at the side of the second surface of the cholesteric liquid crystal layer and having a second surface opposite to the first surface thereof, the circularly polarizing layer selectively transmitting second circularly polarized light to the cholesteric liquid crystal layer when natural light enters from the second surface thereof, the second circularly polarized light having a second circling direction which is opposite to the first circling direction,
   wherein the circularly polarizing layer is formed by laminating a $\lambda/4$ plate and a linearly polarizing filter contacting the $\lambda/4$ plate, which are arranged in that order, from the observing side, and the linearly polarizing filter selectively transmits linearly polarized light, and
   wherein a printed layer printed with a second pattern is arranged at the side of the second surface of the circularly polarizing layer.

2. The identification medium according to claim 1, wherein the printed layer is a metal reflective layer.

3. The identification medium according to claim 1, wherein the printed layer is a layer formed on the circularly polarizing layer by printing.

4. The identification medium according to claim 1, wherein the circularly polarized light having the first circling direction, which is reflected from the identification medium, is light forming the first pattern, which is reflected from the cholesteric liquid crystal layer, and
   the circularly polarized light having the second circling direction, which is reflected from the identification medium, is light forming the second pattern, which is reflected from the printed layer and is transmitted through the circularly polarizing layer.

* * * * *